United States Patent [19]

Rebhan

[11] Patent Number: 5,567,452
[45] Date of Patent: Oct. 22, 1996

[54] MINERAL SUPPLEMENT INCLUDING NON-SEPARATING GRANULES, AND MANUFACTURING PROCESS

[75] Inventor: Herbert Rebhan, New Richmond, Wis.

[73] Assignee: Domain, Inc., New Richmond, Wis.

[21] Appl. No.: 422,349

[22] Filed: Apr. 14, 1995

[51] Int. Cl.$^6$ ............................... A23K 1/00; A23K 1/175
[52] U.S. Cl. ..................... 426/72; 426/73; 426/74; 426/517; 426/518; 426/623; 426/630; 426/639; 426/648; 426/807
[58] Field of Search ............................... 426/73, 74, 623, 426/630, 639, 648, 517, 518, 807, 72

[56] References Cited

U.S. PATENT DOCUMENTS

| | | |
|---|---|---|
| 1,633,711 | 6/1927 | Prince . |
| 1,964,867 | 7/1934 | Allyn . |
| 2,480,103 | 8/1949 | Fux . |
| 2,744,823 | 5/1956 | Diamond ................................. 426/806 |
| 2,999,752 | 9/1961 | Webb ......................................... 426/74 |
| 3,249,441 | 5/1966 | Reynolds et al. ........................ 426/807 |
| 3,567,460 | 3/1971 | McCoy ..................................... 426/518 |
| 3,946,115 | 3/1976 | Brever et al. . |
| 3,992,555 | 11/1976 | Kovacs . |
| 4,582,708 | 4/1986 | Tipton et al. . |
| 4,935,257 | 6/1990 | Yajima . |
| 5,043,170 | 8/1991 | Borenstein et al. . |
| 5,145,695 | 9/1992 | Smith et al. . |
| 5,156,870 | 10/1992 | Evans . |
| 5,264,227 | 11/1993 | Laroche et al. . |

OTHER PUBLICATIONS

Coelho, "Vitamin Stability in Premixes and Feeds: A Practical Approach", 1991 BASF Sypmposium.
Technical Bulletin, BASF, *Keeping Current*, "Vitamin Stability in Premixes and Feeds: A Practical Approach", (2nd Revised Edition KC9138), believed to be available more than 1 year before the filing date of the present application.
Laermer et al., "Could Your Packaging Use a Dose of Vitamin E?", *Food Processing*, Jun. 1994, pp. 35–36.

*Primary Examiner*—Helen Pratt
*Attorney, Agent, or Firm*—Fredrikson & Byron, PA

[57] ABSTRACT

A mineral supplement with vitamins for ruminant animals, and a method for its preparation. Vitamin component granules are provided that contain one or more of Vitamin A, Vitamin D and Vitamin E, the majority of the granules being sized to pass a no. 3½ U.S. Standard Sieve but not a no. 16 U.S. Standard Sieve, the granules having an irregular shape such that the size and shape of the granules substantially prevents them from separating from the mineral supplement. The granules are combined with a mineral mix of finely divided particles that are visibly smaller than the majority of the vitamin granules, the mineral mix containing one or more of calcium, magnesium and phosphorus. The granules may be made by formulating pellets containing the vitamin component, dividing the pellets and retaining the desired size range of granules, and mixing the granules with a finely divided mineral mix.

16 Claims, No Drawings

MINERAL SUPPLEMENT INCLUDING NON-SEPARATING GRANULES, AND MANUFACTURING PROCESS

FIELD OF THE INVENTION

The present invention provides a mineral supplement including vitamin containing granules for ruminant animals and a method of making the mineral supplement.

BACKGROUND

Ruminant animal mineral supplements with vitamins are fed to dairy animals to increase milk production. Mineral supplements are generally fed to ruminant animals either on a free choice basis (hand-fed or separately apportioned to each animal), in a grain mix (mixed with the grain portion of an animal's rations), or in a total mix containing both grain and roughage portions (hay and silage).

Vitamins A, D and E are the most desirable vitamins to use in ruminant animal mineral supplements. Yet, these vitamins do not mix well with minerals, grain mixes or total mixes because the particle size of vitamin-containing materials commonly is much smaller than the particle sizes of the minerals or the mixes. Before the animals ingest the mineral supplements, the fine vitamin particles tend to separate from the minerals or mixes by passing through the interstices between the much larger particles of these other substances. As a result, some animals may receive a lower than desired dosage of vitamins while other animals receive a higher than desired dosage. Animals that receive too much Vitamin A can suffer from Vitamin A toxicosis, and animals that receive too much Vitamin D can suffer from hypocalcemia.

Another problem related to the particle sizes of common vitamin sources is that the potency of Vitamins A, D and E diminishes over time. Vitamins A and D are sensitive to moisture, oxygen, trace minerals, acidic environments, light and heat. Vitamin E is sensitive to basic environments and mildly sensitive to acidic environments and trace minerals. The small particle size of vitamin sources exacerbates the potency problem because a large percentage of the surface area relative to particle volume is exposed to such harmful elements.

Still another problem is that the small particle sizes of vitamin sources inhibits quality control from a manufacturing standpoint because the presence of the vitamin particles in a mineral supplement or mix is not readily detectable by a visual inspection.

It would be desirable to develop a mineral feed supplement with vitamins in which the vitamin containing components are large enough to be seen, do not separate from the mineral mixtures, and maintain vitamin potency for longer periods of time.

Another problem of Vitamins A, D and E is that they emit an unpalatable odor. As a result, cattle do not readily consume their normal quantities of rations if the concentration of these vitamins in the animal feed is too high. A reduction in the consumption of the animal feed by dairy cattle can lead to health and production problems. Accordingly, it would be desirable to develop a mineral supplement with vitamins in which the vitamins stay evenly mixed with the minerals or feed mixes so that the proper amount of the rations will buffer the unpalatable odor of the vitamins.

SUMMARY OF THE INVENTION

The invention involves a ruminant mineral supplement comprising a mixture of a particulate mineral mix and fragmented vitamin containing granules. The vitamin component granules contain one or more vitamins selected from the group consisting of Vitamin A, Vitamin D and Vitamin E and preferably all of these vitamins, the majority of the granules being sized to pass a no. 3½ U.S. Standard Sieve (having a nominal sieve opening of 0.223 inches) but not a no. 16 U.S. Standard Sieve (having a nominal sieve opening of 0.0469 inches). The granules have an irregular shape such that the size and shape of the granules substantially prevents them from separating from the mineral supplement. The mineral mix is in the form of finely divided particles that are visibly smaller than the majority of the vitamin granules, the mineral mix containing from about 3 to about 67 weight percent of one or more minerals selected from the group consisting of calcium, magnesium and phosphorus. Preferably, the vitamin granules contribute from about 3 to about 10 weight percent of the mineral supplement and the mineral mix contributes about 90 to about 97 weight percent of the mineral supplement.

The vitamin granules also contain carder ingredients such as alfalfa meal, sunflower meal, standard middlings, soybean meal, molasses and mineral bentonite. Each vitamin granule desirably is formed as a fragmented portion of an extruded vitamin pellet. The granules desirably are sized so as to pass a no. 3½ U.S. Standard Sieve but not a no. 16 U.S. Standard Sieve. The mineral supplement also includes a mineral mix component that is made of particles that are visibly smaller, and preferably three to four times smaller on the average, than the vitamin granules. The mineral mix in a preferred embodiment contains about 2 to about 37 weight percent calcium, at least 0.5 weight percent mix magnesium, at least 3 weight percent mix phosphorus and at least 0.35 weight percent mix sulfur. The vitamin granules comprise about 3 to about 10 weight percent of the complete mineral supplement and the mineral mix comprises about 90 to about 97 of the complete mineral supplement.

In another embodiment, the invention comprises a method of preparing a mineral supplement for ruminants. The method includes the steps of preparing a vitamin granule composition by combining alfalfa meal, sunflower meal, standard middlings, soybean meal, molasses, bentonite, and one or more vitamins selected from the group consisting of Vitamin D, Vitamin A and Vitamin E, pelletizing the vitamin granule composition to form cohesive pellets, dividing the pellets to form vitamin granules having irregular shapes, and selecting and retaining granules in a size range such that a majority of the granules pass a no. 3½ U.S. Standard Sieve but not a no. 16 U.S. Standard Sieve. The retained vitamin granules are combined with a particulate, finely divided mineral mix containing at least one mineral selected from the group consisting of calcium, magnesium and phosphorus, the mineral mix particles being visibly smaller than the retained vitamin granules. The size and shape of the retained vitamin granules substantially prevents them from separating from the mineral mix. Preferably, the average size of the vitamin granules (as measured by nominal sieve opening of the sieve upon which the greatest weight of granules are retained) is at least three times and most preferably at least four times greater than the average size (as identically measured) of the particles of the mineral mix.

The mineral mix employed in the mineral supplement and method of the invention desirably contains about 2 to about 37 weight percent calcium, at least 0.5 weight percent magnesium, at least 3 weight percent phosphorus and at least 0.35 weight percent sulfur, and is made by such methods as extrusion of an extrudable mineral containing composition as is known to the art.

DETAILED DESCRIPTION OF A PREFERRED EMBODIMENT

The vitamin granules are made by mixing Vitamins A, D and E together with other ingredients that act as a carrier for the vitamins. The mixture of Vitamins A, D and E and the carrier ingredients are extruded through a pelletizer at an appropriate temperature of e.g., 140° F. to 165° F., preferably at 150° F. The warm, malleable extruded vitamin mixture may be "pelletized", that is, cut into pellets approximately ¼" to ⅜" long, shortly after the mixture passes through the extrusion dye. After the vitamin pellets are formed, they are cooled until they become hard and somewhat brittle, and passed over a 3½ U.S. Standard Sieve to remove the fine particles.

Vitamin granules may be formed by crushing the cooled vitamin pellets between rollers. The outer surface of the vitamin granules that are thus formed is generally rough and jagged because the consistency of the carrier ingredients is coarse, causing the pellets to randomly fracture when they are crushed. The granules, therefore, are also formed into random shapes. The vitamin granules desirably are sized to pass a no. 3½ U.S. Standard Sieve but to be held upon a no. 16 U.S. Standard Sieve. As thus formed and sized, the granules may have a bulk density of about 32 lbs./ft.$^3$ (about 512 Kg/m$^3$). In comparison, the mineral mix with which the vitamin granules are combined preferably has a particle size three or four times smaller, and the mineral mix may have a greater bulk density, e.g., of about 61 or 62 lbs./ft$^3$ (about 976 to 992 Kg./m$^3$). The greater size of the granules and their rough, jagged surfaces are each thought to contribute to the excellent capability of the vitamin granules to remain uniformly mixed with the mineral mix particles, and the fact that the vitamin granules have a bulk density only about one-half that of the mineral mix may also contribute to this feature.

The vitamin granules of the present invention maintain their potency for extended periods of time, provide a consistent dosage of vitamins and minerals, and are palatable in normal feed rations. The vitamins do not lose their potency as quickly when they are formed into granules because less surface area relative to a given volume of the granulated vitamins is exposed to the decomposing elements compared to finely divided vitamin sources. The dosage of vitamins is also consistent throughout the rations because the larger size, random shapes and rough outer surfaces of the granules substantially prevents them from separating from the feed mineral. Moreover, the granules are more palatable because they stay evenly mixed with the feed rations and they are smaller than pellets, both of which generally prevent an excessively high concentration of vitamins in any given volume of feed rations.

In another embodiment of the invention, crushing of the vitamin pellets with accompanying production of finely divided materials can be avoided by instead cutting the pellets into the desired granular sizes as the warm pellets exit the pelletizer. That is, the vitamins and the carrier ingredients are mixed and extruded as described above, but instead of crushing the pellets between rollers, knives cut the vitamin mix into granules as the mix exits the final die of the pelletizer. The granules are generally less than ⅛" in length, and preferably about ¹⁄₁₆". In this embodiment, the particle size of the granules is controlled by appropriately controlling e.g., the rate of extrusion and the rate at which cutting occurs.

The following are non-limiting examples of the compounding and manufacture of vitamin granules that maintain vitamin potency for extended periods of time.

EXAMPLE 1

A vitamin granule composition was prepared by admixing the following ingredients in the following amounts: 2.711 weight percent Vitamin A on a carrier at 650,000 IU/g., 1.107 weight percent Vitamin D-3 at 400,000 IU/g., 7.04 weight percent dry Vitamin E at 400 IU/g. on a carrier at 50 weight percent, 36 weight percent alfalfa meal, 25 weight percent sunflower meal, 15 weight percent standard middlings, 7.643 weight percent soybean meal, 3 weight percent molasses and 2.5 weight percent bentonite.

EXAMPLE 2

A vitamin granule composition was prepared by admixing the following ingredients in the following amounts: 3.968 weight percent Vitamin A on a carrier at about 440,000 IU/g., 1.107 weight percent Vitamin D-3 at about 400,000 IU/g., 7.040 weight percent Vitamin E on a carder at about 500 IU/g. at 50 weight percent, 36 weight percent alfalfa meal, 25 weight percent sunflower meal, 15 weight percent standard middlings, 7.643 weight percent soybean meal, 3 weight percent molasses and 2.5 weight percent mineral bentonite.

The vitamin granule compositions of Examples 1 and 2 are pelletized and then fragmented into vitamin granules as described above, using suitable sieves to select the desired particle size. The vitamin granules are mixed with a mineral composition to form the mineral feed supplement of the invention. The particle sizes of the vitamin granules are much larger than the mineral feed supplement, allowing farmers to see the vitamin granules in the mineral supplement after it is added to the feed rations. Farmers, therefore, are assured that their animals are getting the appropriate vitamins in the appropriate dosages.

The following are examples of complete mineral supplements in accordance with the invention containing either vitamin granule composition set forth in Example 1 or Example 2.

EXAMPLE A

A mineral feed supplement was prepared by admixing the following ingredients in the following amounts: 5.224 weight percent granulated vitamins of Example 1 or Example 2; 66.54 weight percent calcium phosphate (21% by weight); 15.36 weight percent calcium carbonate; 5.8 weight percent magnesium oxide; 5.54 weight percent of a mineral pre-mix containing 18 to 20% calcium, 12.2% manganese, 8% zinc, 4% iron, 0.4% copper, 0.24% cobalt iodine and 0.2% cobalt; 2.065 weight percent selenium concentrate (0.16% by weight); 0.625 weight percent of a concentrate containing 5.06% zinc, 2.8% manganese, 1.76% copper, 0.36% cobalt, 16.42% methionine, 7.61% lysine, 20% protein, 0.1% fat and 2% fiber; and 0.18% copper sulfate.

EXAMPLE B

A mineral feed supplement in accordance with the invention was prepared by admixing the following ingredients in the following amounts: 4.229 weight percent granulated vitamins of Example 1 or Example 2; 49.89 weight percent calcium phosphate (21% by weight); 33.80 weight percent calcium carbonate; 4.733 weight percent magnesium oxide; 4.43 weight percent of a mineral pre-mix containing 18 to 20% calcium, 12.2% manganese, 8% zinc, 4% iron, 0.4% copper, 0.24% cobalt iodine and 0.2% cobalt; 1.66 weight percent selenium concentrate (0.16% by weight); 0.5 weight percent of a concentrate containing 5.06% zinc, 2.8% manganese, 1.76% copper, 0.36% cobalt, 16.42% methionine, 7.61% lysine, 20% protein, 0.1% fat and 2% fiber; and 0.75 weight percent vegetable fat.

EXAMPLE C

A mineral feed supplement in accordance with the invention was prepared by admixing the following ingredients in the following amounts: 3.875 weight percent granulated vitamins of Example 1 or Example 2; 40.381 weight percent calcium phosphate (21% by weight); 45.612 weight percent calcium carbonate; 3.89 weight percent magnesium oxide; 3.692 weight percent of a mineral pre-mix containing 18 to 20% calcium, 12.2% manganese, 8% zinc, 4% iron, 0.4% copper, 0.24% cobalt iodine and 0.2% cobalt; 1.383 weight percent selenium concentrate (0.16% by weight); 0.417 weight percent of a concentrate containing 5.06% zinc, 2.8% manganese, 1.76% copper, 0.36% cobalt, 16.42% methionine, 7.61% lysine, 20% protein, 0.1% fat and 2% fiber; and 0.75 weight percent vegetable fat.

One mineral pre-mix that is particularly useful in the invention is Trace Mineral Mix No. 2 manufactured by Baltzell Company. One concentrate that is useful in the invention is 4-Plex-C™ manufactured by Zinpro Corporation.

While a preferred embodiment of the present invention has been described, it should be understood that various changes, adaptations and modifications may be made therein without departing from the spirit of the invention and the scope of the appended claims.

What is claimed is:

1. A mineral supplement with vitamins for ruminant animals, comprising:

vitamin component granules containing one or more vitamins selected from the group consisting of Vitamin A, Vitamin D and Vitamin E, the majority of the granules being sized to pass a no. 3½ U.S. Standard Sieve but not a no. 16 U.S. Standard Sieve, the granules having an irregular shape such that the size and shape of the granules substantially prevents them from separating from the mineral supplement, and a mineral mix of finely divided particles that are visibly smaller than the majority of the vitamin granules, the mineral mix containing from about 3 to about 67 weight percent of at least one of the minerals selected from the group consisting of calcium, magnesium and phosphorus, wherein the vitamin granules are about 3 to about 10 weight percent of the mineral supplement and the mineral minx is about 90 to about 97 weight percent of the mineral supplement.

2. The mineral supplement of claim 1, wherein the vitamin granules are crushed pellets and each granule has a non-uniform, random shape.

3. The mineral supplement of claim 2, wherein vitamin granules that contain Vitamin A contain sufficient Vitamin A to provide from about 200,000 to about 500,000 IU of Vitamin A per pound of the mineral supplement, vitamin granules that contain Vitamin D contain sufficient Vitamin D to provide from about 50,000 to about 150,000 IU of Vitamin D per pound of the mineral supplement, and vitamin granules that contain Vitamin E contain sufficient Vitamin E to provide from about 400 to about 1,000 IU of Vitamin E per pound of the mineral supplement.

4. The mineral supplement of claim 3 wherein the vitamin granules contain each of Vitamin D, Vitamin A and Vitamin E.

5. The mineral supplement of claim 2, wherein the vitamin granules further comprise about 25 to about 45 weight percent alfalfa meal, about 15 to about 35 weight percent sunflower meal, about 5 to about 15 weight percent standard middlings, about 5 to about 12 weight percent soybean meal, about 1 to about 4 weight percent molasses and about 2 to about 5 weight percent mineral bentonite.

6. The mineral supplement of claim 5, wherein the vitamin granules contain about 33 to about 38 weight percent alfalfa meal, about 23 to about 27 weight percent sunflower meal, about 13 to about 17 weight percent standard middlings, about 7 to about 8 weight percent soybean meal, about 2.5 to about 3.5 weight percent molasses and about 2 to about 3 weight percent mineral bentonite.

7. The mineral supplement of claim 2, wherein the average size of the vitamin granules is at least twice the average size of the mineral mix particles.

8. The animal feed additive of claim 2, wherein the vitamin granules are coated with a vegetable oil.

9. The animal feed additive of claim 2, wherein the vitamin granules have a generally jagged outer surface.

10. A method of making an animal feed additive having granulated vitamins, comprising the step of:

preparing a vitamin granule composition by combining alfalfa meal, sunflower meal, standard middlings, soybean meal, molasses, bentonite, and one or more vitamins selected from the group consisting of Vitamin D, Vitamin A and Vitamin E;

pelletizing the vitamin granule composition to form cohesive pellets;

dividing the pellets to form vitamin granules having irregular shapes and selecting and retaining granules in a size range passing a no. 3½ U.S. Standard Sieve but being held on a no. 16 U.S. Standard Sieve;

combining the retained vitamin granules with a particulate mineral mix containing at least one mineral selected from the group consisting of calcium, magnesium and phosphorus, the mineral mix particles being visibly smaller than the retained vitamin granules, the size and shape of the retained vitamin granules substantially preventing them from separating from the mineral mix.

11. The method of claim 10 wherein the particle sizes of the vitamin granules and the mineral mix are selected such that the average size of the vitamin granules is at least twice the average size of the mineral mix particles.

12. The method of claim 10 wherein the dividing step comprises cutting the vitamin pellets as they exit a pelletizer into granules.

13. The method of claim 10 wherein the dividing step comprises crushing the vitamin pellets.

14. The method of claim 13 further comprising the step of cooling the vitamin pellets before they are crushed.

15. The method of claim 10 wherein vitamin granules that contain Vitamin A contain sufficient Vitamin A to provide from about 200,000 to about 500,000 IU of Vitamin A per pound of the mineral supplement, vitamin granules that contain Vitamin D contain sufficient Vitamin D to provide from about 50,000 to about 150,000 IU of Vitamin D per pound of the Mineral supplement, and vitamin granules that contain Vitamin E contain sufficient Vitamin E to provide from about 400 to about 1,000 IU of Vitamin E per pound of the mineral supplement.

16. The method of claim 10 wherein the weight ratio of vitamin granules to mineral mix is not greater than about 10:90.

* * * * *